US008806863B2

(12) United States Patent  
Gierer et al.

(10) Patent No.: US 8,806,863 B2
(45) Date of Patent: Aug. 19, 2014

(54) HYDRAULIC TRANSMISSION CONTROL

(75) Inventors: Georg Gierer, Kressbronn (DE); Thilo Schmidt, Meckenbeuren (DE); Christian Popp, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 493 days.

(21) Appl. No.: 13/259,594

(22) PCT Filed: Mar. 25, 2010

(86) PCT No.: PCT/EP2010/053889
§ 371 (c)(1),
(2), (4) Date: Sep. 23, 2011

(87) PCT Pub. No.: WO2010/112390
PCT Pub. Date: Oct. 7, 2010

(65) Prior Publication Data
US 2012/0011842 A1 Jan. 19, 2012

(30) Foreign Application Priority Data

Apr. 1, 2009 (DE) .................. 10 2009 002 105

(51) Int. Cl.
*F16D 31/02* (2006.01)
*F15B 13/04* (2006.01)
*F15B 11/08* (2006.01)

(52) U.S. Cl.
USPC ................................ 60/459; 91/461; 60/468

(58) Field of Classification Search
USPC .............................................. 91/461; 60/468
See application file for complete search history.

(56) References Cited

U.S. PATENT DOCUMENTS

| 2,905,433 | A1 | 6/2005 | Schmidt et al. |
| 6,905,433 | B2* | 6/2005 | Schmidt et al. ............... 475/121 |
| 6,997,300 | B2* | 2/2006 | Schmidt et al. ............ 192/85.63 |
| 7,794,349 | B2 | 9/2010 | Gierer et al. |
| 7,878,708 | B2 | 2/2011 | Fritzer et al. |
| 8,662,272 | B2* | 3/2014 | Martin et al. ............ 192/48.601 |
| 2010/0120583 | A1 | 5/2010 | Fritzer |

FOREIGN PATENT DOCUMENTS

| DE | 102 39 951 A1 | 3/2004 |
| DE | 10 2005 012 586 A1 | 9/2006 |
| DE | 10 2006 049 972 A1 | 5/2008 |
| DE | 10 2007 020 346 A1 | 11/2008 |
| EP | 1 859 183 B1 | 10/2008 |
| EP | 2 019 234 A2 | 1/2009 |
| WO | 2006/097209 A1 | 9/2006 |
| WO | 2006/097295 A1 | 9/2006 |
| WO | 2008/049735 A1 | 5/2008 |

* cited by examiner

*Primary Examiner* — Edward Look
*Assistant Examiner* — Daniel Collins
(74) *Attorney, Agent, or Firm* — Davis&Bujold, PLLC; Michael J. Bujold

(57) ABSTRACT

A hydraulic transmission unit comprises at least one pressure regulation valve (1) and a pilot control valve (2) which is connected to the pressure regulation valve (1) by a pilot control line (35). A pre-filling valve (3, 303) sets a pre-filling pressure (p_3) to avoid draining of a clutch (20) and the lines (231, 331) connected to the clutch (20) in an operating condition in which the clutch (20) is not actuated. To avoid draining when the clutch when in the operating condition, the pilot control line (35) is also connected to at least one line (236, 238, 336, 338) which is pressurized with a second pre-filling pressure (p_3).

14 Claims, 3 Drawing Sheets

HYDRAULIC TRANSMISSION CONTROL

This application is a National Stage completion of PCT/EP2010/053889 filed Mar. 25, 2010, which claims priority from German patent application serial no. 10 2009 002 105.1 filed Apr. 1, 2009.

FIELD OF THE INVENTION

The invention concerns a hydraulic transmission control.

BACKGROUND OF THE INVENTION

As is known, in hydraulically actuated automatic transmissions, the hydraulic control of transmission shift elements such as hydraulically actuated clutches is effected by means of pressure regulation valves.

One possible principle for pressure regulation is the so-termed pilot control principle. In this, a pilot control valve acting as an electric pressure control valve converts the electric signal from an electronic transmission control unit into a pressure different from (lower than) the system pressure. The pressure signal of the pilot control valve, the so-termed pilot control pressure, passes via a pilot control line to a pressure regulation valve, by means of which the pilot control pressure is then amplified to a higher pressure signal so that the shift element is supplied with a working pressure and volume flow appropriate for its filling.

The pressure regulation (modulation) of the pilot control valve designed for example as a pressure reduction valve takes place by virtue of a hydraulic slider, which adjusts its working pressure in that the slider modulates between a high feed pressure and a low tank pressure.

If a transmission shift element is in the non-actuated condition, i.e. it is not acted upon by a working pressure and is connected to a tank or transmission housing at the pressure of the surroundings, the transmission shift elements and the lines leading to them can drain, or air can be precipitated from the working medium. This results in a long filling time and hence a long shifting time of the clutch. Furthermore the regulating quality of the working pressure is poor, since it shows large pressure fluctuations. The precipitation of air produces considerable scatter and interactions, which the transmission software can only insufficiently picture in the form of a model or take into account in controlling the shift elements.

DE 10 2007 020 346A1 shows a hydraulic control system for this type, in which the collection of air in a non-actuated piston space of a transmission shifting element is avoided in that the piston space is connected to a fluid reservoir.

To prevent air precipitation and draining of the transmission shift elements, in the non-actuated condition the pressure in a transmission shift element is set at a low pressure potential. This pressure potential, which is only slightly higher than the ambient pressure of the transmission, will be called the pre-filling pressure in what follows. By pre-filling the clutch lines, air precipitation and therefore the variance of controllability are considerably reduced, so that according to the present state of the art hydraulically actuated clutch systems have clutch pre-filling means. Such a transmission control system is known from DE 102 39 915A1.

The advantage of lines pressurized with the pilot control pressure, henceforth referred to as pilot control lines, generally consists in their arrangement within the hydraulic control system. By virtue of the fitting position of the hydraulic control unit in the oil sump, draining of the pilot control lines is thus excluded owing to gravity. There are only air precipitations, which are trapped in the new condition during the fitting of the hydraulic control system but which no longer occur once operation of the transmission has started. However, in the case of hydraulic controls not located in the oil sump of the transmission, the problem arises that an at least partial draining of the pilot control lines takes place, particularly when the transmission is static and the transmission pump is not delivering any pressure.

In addition it has disadvantageously been found that when the pilot control valve has not been actuated for a long time, air is even precipitated in the pilot control lines when the oil pump is operating, this mainly occurring only in lines that carry a large oil volume.

This results in poor regulation of the pilot control pressure when the pressure regulation valve is actuated, leading to similar or even more pronounced negative effects on the adjustment of the clutch pressure.

SUMMARY OF THE INVENTION

The purpose of the present invention is to improve a transmission control system so as to avoid the above-mentioned disadvantages of the known arrangements. In particular, the draining of the pilot control lines and the formation of air precipitation in the pilot control lines are to be avoided.

Accordingly, a hydraulic transmission control system comprises at least one pressure regulation valve and a pilot control valve connected thereto by a pilot control line. In addition a pre-filling valve is provided for setting a pre-filling pressure which, in an operating condition in which a clutch that acts as a transmission shift element is not actuated, pressurizes the clutch and the lines connected to it. A non-actuated clutch is understood to mean that is it not acted upon by a working pressure, so that no torque transmission can take place. Owing to the pre-filling pressure, draining of the clutch and the lines connected to it is prevented. Likewise, the production of air inclusions in the clutch and the lines connected to it is prevented. According to the invention, again to avoid draining or the production of air inclusions in this operating condition, the pilot control line can be connected to at least one further line which is pressurized with a second pre-filling pressure.

According to a first advantageous feature the first pre-filling pressure is higher than the second pre-filling pressure.

Alternatively, a design is possible in which the first and second pre-filling pressures are equal.

Preferably, for setting the second pre-filling pressure a second pre-filling valve is provided.

In a further variant it is possible for a common pre-filling valve to be provided for setting the first pre-filling pressure and the second pre-filling pressure.

In this connection, another embodiment provides that the first pre-filling pressure and the second pre-filling pressure are lower than the clutch pressure but higher than the ambient pressure.

Furthermore, it can be provided that a pre-filling valve is designed as a seat valve and acts as a pressure-limiting valve.

A further embodiment provides that a pre-filling valve designed as a seat valve is in the form of a ball valve or plate valve.

Alternatively, it is possible for a pre-filling valve to act as a pressure-reducing valve and to be in the form of a slide valve.

Finally, it is regarded as advantageous for a second and third line supplied with operating medium from a hydraulic supply system and pressurized with the first pre-filling pressure, to be connected to a fourth and fifth line pressurized with the second pre-filling pressure, via a constriction that acts as a hydraulic resistance. In this case the constriction can be in the form of a throttle or a diaphragm aperture.

In a further design of the invention the second line for pre-filling the pressure regulation valve or the transmission shift element and the fourth line for pre-filling the pilot control valve or the pilot control line are connected to the hydraulic supply system independently of one another.

Moreover, it is possible for a plurality of pilot control valves to be arranged in the hydraulic transmission control system, which are connected to a common pre-filling line, and for the second pre-filling pressure in the pre-filling line to be adjustable by means of a common pre-filling valve.

Alternatively, it is possible for a plurality of pilot control valves to be arranged in the hydraulic transmission control system and for a pre-filling valve to be associated with each pilot control valve. Since these are also connected by means of the pre-filling line, thanks to this arrangement of several pre-filling valves, volume-flow-induced dynamic pressures in the pre-filling line are avoided.

Furthermore, according to the invention it can be provided that a temperature sensor is arranged in a space on the venting side. This position can be for example in or on a spring space of the pre-filling valve or on a side of the valve seat facing toward a venting space.

In a further embodiment the pre-filling pressure of the pilot control valve is limited to 0.1 bar.

Preferably, the hydraulic transmission control system according to the invention is arranged in a transmission for a motor vehicle.

BRIEF DESCRIPTION OF THE DRAWINGS

Example embodiments of the invention are illustrated in the drawings and explained in more detail below.

The drawings show.

DETAILED DESCRIPTION OF THE PREFERRED EMBODIMENTS

Figure 1:
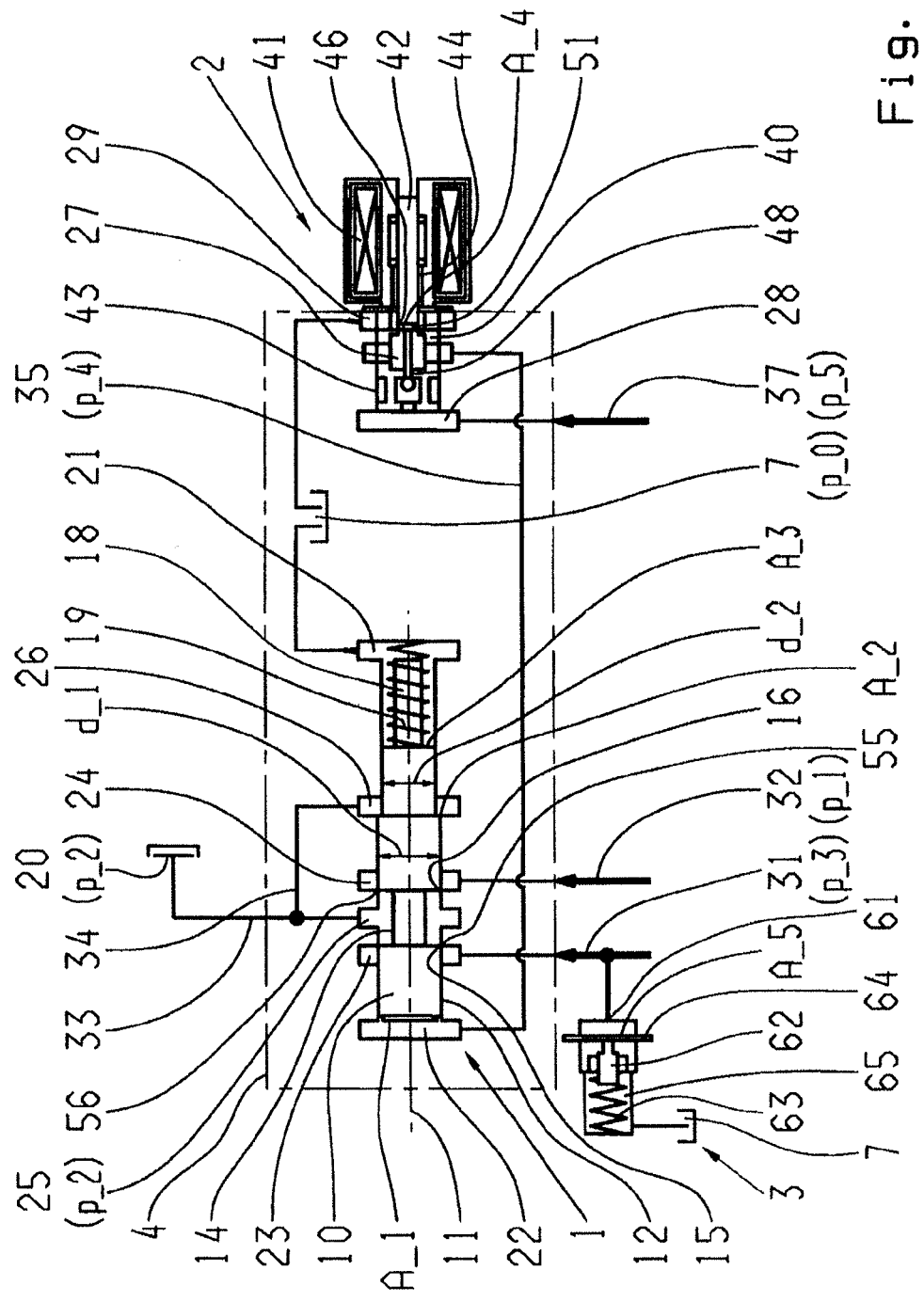
FIG. 1: A hydraulic transmission control system of the prior art.

FIG. 1 shows a hydraulic transmission control system 100 according to the prior art, which is arranged on a transmission housing. The hydraulic transmission control system 100 comprises a pressure regulation valve 1 designed as a pressure reducing valve and a pilot control valve 2 designed as an electromagnetic proportional valve. The pressure regulation valve 1 and the pilot control valve 2 are arranged in a common control unit housing 4. Among other things the pressure regulation valve 1 comprises a valve slide 10, which is arranged to move in a valve bore 12 in the direction of its long axis 11.

The cylindrical valve slide 10, which has a maximum outer diameter $d\_1$, has at a first end a circular axial end face $A\_1$. By virtue of a cross-section reduction 14 in the form of a recess in the outer contour of the valve slide 10, two control edges 15 and 16 are formed. Toward a second end the diameter of the valve slide 10 is reduced to an outer diameter $d\_2$, so that at the step-shaped transition to the outer diameter $d\_1$ an annular axial reaction surface $A\_2$ is formed. At the end of the valve slide 10 on the right in the figure, this is again reduced in diameter to a cylindrical outer contour, whereby a cylindrical spring-guide pin 18 and an axial ring surface $A\_3$ are formed.

Concentrically around the spring-guide pin 18 is arranged a spring 19, which rests on one side on the valve slide 10 against the axial ring surface $A\_3$ and is supported on the other side against the wall of a pressure space 21. Hereby, with its axial end face $A\_1$ the valve slide 10 is pre-stressed against the wall of a pressure space 22 when the system is in the switched-off condition and the pressure space 22 is unpressurized. The pressure space 21 is vented. The terms "venting" or "to vent" are understood to mean a connection of the pressure space or line concerned to a venting space 7 under ambient pressure $p\_0$, so that in the pressure space concerned the pressure is also equal to the ambient pressure $p\_0$. Besides the pressure spaces 21 and 22, four further pressure spaces 23, 24, 25 and 26 also pass through the valve bore 12. The pressure space 24 is pressurized via a line 32 by a system pressure $p\_1$. This system pressure $p\_1$ is the highest pressure in the hydraulic system and is produced by a central operating medium supply system.

A "line" is understood to mean any internal contour capable of carrying and delivering a liquid or gaseous working medium, such as a duct formed in a housing, a separate tube or hose connection, or even an opening that connects hydraulic or pneumatic components.

The pressure space 23 is pressurized, via a line 31, with a pre-filling pressure $p\_3$ which is substantially lower than the system pressure $p\_1$ and preferably slightly above the ambient pressure $p\_0$.

Between the pressure spaces 23 and 24 is formed a pressure space 25, which is connected by a line 33 to a consumer, in this case a clutch 20 acting as a transmission shift element. The clutch 20 is pressurized with a clutch pressure $p\_2$ which is adjusted by means of the pressure regulation valve 1 and can have values up to the system pressure $p\_1$ as a maximum. A line 34 branching off from the line 33 is connected to a pressure space 26, so that the reaction surface $A\_2$ is acted upon by the clutch pressure $p\_2$ to be regulated, so that the feedback required for regulation of the pressure to be regulated is provided.

The objective of the present transmission control system is to adjust or modify the clutch pressure $p\_2$, for example as a function of a clutch torque to be transmitted, or to vary the clutch pressure $p\_2$ over time, for example as desired during shifting processes. With the system described this variation of the clutch pressure $p\_2$ is achieved by varying a pilot control pressure $p\_4$ in the pressure space 22. The adjustment of the pilot control pressure $p\_4$ is the task of the pilot control valve 2.

The pilot control valve 2 consists of a valve housing 40, an electromagnet 41 connected to the valve housing 40, and a pilot control piston 42, the valve housing 40 being arranged in a receiving bore 43. The pilot control piston 42 is arranged to move longitudinally in a guide bore 44 and has two different diameters, such that a reaction surface $A\_4$ and a control edge 46 are formed. The receiving bore 43 is penetrated by a pressure space 27, a pressure space 28 and a pressure space 29. The pressure space 28 is supplied with operating medium via a line 37 and acted upon by a reducing pressure $p\_5$. The reducing pressure $p\_5$ is lower than the system pressure $p\_1$ and higher than or equal to the pilot control pressure $p\_4$.

When the hydraulic system is operating, in the pilot control valve 2 an electromagnetic force acts on the pilot control piston 42. The size of the electromagnetic force is a function of an electric current flowing through the electromagnet 41. This produces a force equilibrium at the pilot control piston 42, which adopts a position in which, with an inside contour of the valve housing 40, it forms a throttle gap 48 between the pressure space 28 and the pressure space 27. The operating medium, which in the pressure space 28 is under the reducing pressure $p\_5$, flows through the throttle gap 48 into the pressure space 27, during which, owing to the flow losses in the throttle gap 48, the pressure in the pressure space 27 falls to the pilot control pressure $p\_4$. The pilot control pressure $p\_4$ acts on the reaction surface $A\_4$, producing a reaction force. Thus, at the pilot control piston 42 there is a force equilibrium of hydraulic and electromagnetic forces, which determines the size of the throttle gap 48 and hence the level of the pilot control pressure $p\_4$. By virtue of this regulation process the pilot control pressure $p\_4$ remains constant for a constant current value. If it is desired to reduce the pilot control pressure $p\_4$, by passing a smaller current and so reducing the electromagnetic force the pilot control piston 42 is displaced to the right, so that a throttle gap 51 through which part of the operating medium can flow out into the vented pressure space 29 becomes wider.

Via a pilot control line 35 the pressure space 27 is connected to the pressure space 22, so that the pilot control pressure $p\_4$ also acts on the axial end face $A\_1$. This produces a hydraulic force which acts in opposition to the spring force of the spring 19 and the reaction force on the reaction surface $A\_2$. Above a certain level of the pilot control pressure $p\_4$, the hydraulic force exceeds the pre-stressing force of the spring and the valve slide 10 is displaced to the right. Thereby, at the control edge 15 the valve slide 10 separates the pressure space 23 from the pressure space 25. Before this interruption the clutch pressure $p\_2$ corresponded to the pre-filling pressure $p\_3$. When the valve slide 10 moves to the right, owing to their positions the control edge 16 and an edge 56 of the housing form a throttle gap through which the pressure spaces 24 and 25 are connected to one another. The operating medium, which is under the system pressure $p\_1$ in the line 32 and the pressure space 24, now flows through the throttle gap and passes, via the pressure space 25, into the line 33 and hence to the clutch 20, where the clutch pressure $p\_2$ is now produced by the equilibrium of the spring force, the reaction force and the pilot control force on the valve slide 10. If the clutch pressure $p\_2$ increases, for example due to disturbances at the clutch 20, this acts upon the reaction surface $A\_2$ and pushes the valve slide 10 to the left, whereby the throttle gap between the control edge 16 and the housing edge 56 becomes smaller and a second throttle gap between the control edge 15 and a housing edge 55 become larger, so that the system pressure $p\_1$ is throttled. Consequently the clutch pressure $p\_2$ decreases again and assumes a desired nominal value. If the clutch pressure $p\_2$ decreases due to events at the clutch the reaction force decreases and the valve slide 10 moves in the opposite direction. If the pilot control pressure $p\_4$ is now increased by means of the pilot control valve 2, the equilibrium at the valve slide 10 is now shifted by the new larger pilot control force toward a higher clutch pressure $p\_2$.

In the switched-off condition of the hydraulic transmission control system 100 and the clutch 20, as described earlier the valve slide 10 rests with its axial end face $A\_1$ against the wall of the pressure space 22. In this position the pressure space 24 pressurized with the system pressure $p\_1$ is separated from the pressure space 25 and the pressure space 23 is connected to the pressure space 25 and hence to the clutch 20. If the pressure space 23 were to be vented, the pressure space 25 and the line 33 and hence the clutch 20 in the switched-off and therefore unpressurized condition would drain. Likewise, air precipitation from the operating medium could also form. Because of this, for example when the clutch 20 is connected the time to fill the clutch and hence the pressure build-up in the clutch 20, and consequently the shifting times, would be disadvantageously prolonged. Likewise, the regulation quality of a pressure ramp (clutch pressure overtime) would be poor.

Such air precipitations cause considerable variability and interactions, which can only be inadequately pictured by the transmission software in the form of a model or taken into account for the control of the shift elements.

To avoid the disadvantageous effects, the pressure space 23 is pressurized via a line 31 by a pre-filling pressure $p\_3$. This prevents air precipitation from the operating medium or draining of the clutch 20 or pressure spaces 24 and 25 and of the lines 33 and 34.

In an automatic transmission there are arranged several clutches and in each case the clutch pressure is adjusted by a pressure regulation valve with an associated pilot control valve, so that several pressure regulation valves and pilot control valves are present. The pressure spaces 23 of all the pressure regulation valves are connected to one another by the line 31.

The pre-filling pressure $p\_3$ is limited upward by means of a pre-filling valve 3, this being connected to the line 31 by a connection piece 61. The pre-filling valve 3 acts as a pressure-limiting valve and is designed as a seat valve. It consists of a piston 62 which is pressed against a valve seat 64 by the pre-stressing force of a spring 63. Since the flat surface of the piston 62 covers the valve seat 64 like a plate, this design of a seat valve is also called a plate valve. In combination with a valve seat surface $A\_5$ acted upon by the pre-filling pressure $p\_3$ the pre-stressing force of the spring 63 determines the maximum level of the pre-filling pressure $p\_3$. A spring space 65 on the side of the piston 62 facing away from the connection 61 is vented. It would also be conceivable to design a pre-filling valve as a pressure-reducing valve.

The lines that can be pressurized with the pilot control pressure $p\_4$ are usually located in the control housing 4. Thus, owing to the fitting position of the control housing 4 below the liquid level of the operating medium in the transmission housing, draining of the lines due to gravity is prevented and there are only air precipitations, which are trapped in the new condition during assembly of the hydraulic control system.

However, in control units arranged above the liquid level of the operating medium stored in the transmission housing, the problem arises that draining of the lines that can be pressurized with the pilot control pressure $p\_4$, such as the pilot control line 35, takes place. This happens particularly when the transmission is at rest, when a transmission pump is not delivering any operating medium to the hydraulic control system and is thus not producing any pressure. In addition it has been found that when the pilot control valve 2 has not been actuated for a long time, air precipitates in the lines even when the transmission pump is operating, although this affects only lines with large volumes or large hydraulic diameters.

Figure 2:
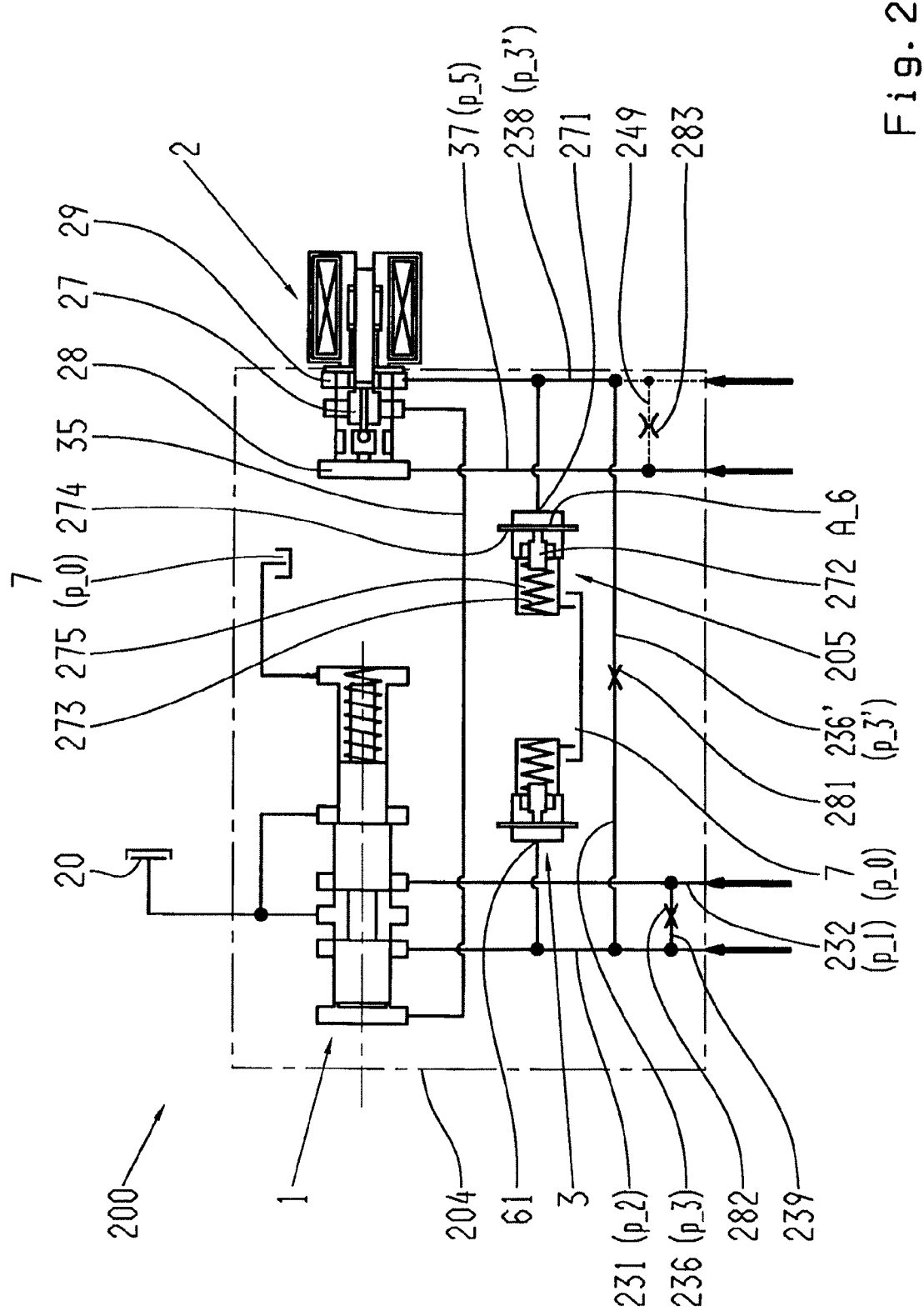
FIG. 2: A hydraulic transmission control system with a respective pre-filling valve for a pressure regulation valve and for a pilot control valve.

FIG. 2 shows a hydraulic transmission control system 200 according to the invention, which solves the problem of pilot control line draining as described with reference to FIG. 1. In this case, on the pilot control valve 2, the pressure space 29 is not vented as in the prior art according to FIG. 1, but is connected by three lines 236, 236' and 238 to a line 231 which is pressurized with the pre-filling pressure $p\_3'$. As in FIG. 1, the pre-filling pressure $p\_3$ is limited upward by the pre-filling valve 3. The pre-filling valve 3 is connected via a connection point 61 to the line 231 and its structure is as described under FIG. 1.

Between the lines 236 and 236' is arranged a constriction 281 in the form of a diaphragm aperture or a throttle. Owing to the hydraulic losses at the constriction 281, a pre-filling pressure p_3' is produced in the lines 236' and 238 and in the pressure space 29, which is lower than the pre-filling pressure p_3. To the line 238 is connected via a connector 271 a pre-filling valve 205, which is accommodated in the control unit housing 204 and which comprises a plate-shaped piston 272, a spring 273 and a valve seat 274. A spring space 275 is vented. Just as the pre-filling valve 3, so too the pre-filling valve 205 is designed as a seat valve and acts as a pressure-limiting valve. Alternatively, the valve seat can also be closed by a ball. If the spatial arrangement is suitable, then apart from the force of a spring the body closing the valve seat can be pre-stressed by gravity. Since the pre-filling pressure p_3' to be produced at the pre-filling valve 205 is lower than the pre-filling pressure p_3 at the pre-filling valve 3, the spring characteristic or the pre-stressing of the spring 273 and/or the valve seat area A_6 are chosen appropriately. It would also be conceivable to design the pre-filling valve 205 as a pressure-reducing valve.

Since the pre-filling pressure p_3' is lower than the pre-filling pressure p_3, it is advantageously possible to reduce the pilot control pressure p_4, farther and thus to vary it within a large pressure range.

In the switched-off condition of the hydraulic transmission control system 200, no current flows through the electromagnet 41, so that the pilot control piston 42 moves to the right and the throttle gap 51 becomes larger. The pressure spaces 27 and 29 are thus connected with one another so the pilot control line 35 is pressurized with the pre-filling pressure p_3, which prevents draining of the pilot control line 35 or the formation of air precipitates in it.

Thus, the pre-filling pressure p_3' is limited by the pre-filling valve 205 and the pre-filling pressure p_3, as in FIG. 1, by the pre-filling valve 3.

The line 232 pressurized with the system pressure p_1 is connected to the line 231 via a line 239, in which is arranged a constriction 282 in the form of a diaphragm aperture or a throttle. Owing to the pressure losses at the constriction 282 the system pressure p_1 is reduced to the pre-filling pressure p_3 in the line 231.

Such a structure is also conceivable as an alternative between the lines 37 and 238, as indicated with broken lines. The broken lines represent a line 249 and the extended line 238, with the line 249 connecting the line 37 to the line 238. In the line 249 is arranged a constriction 283 in the form of a throttle or diaphragm aperture. In this alternative, the lines 236 and 236' and the constriction 281 can be omitted.

Figure 3:
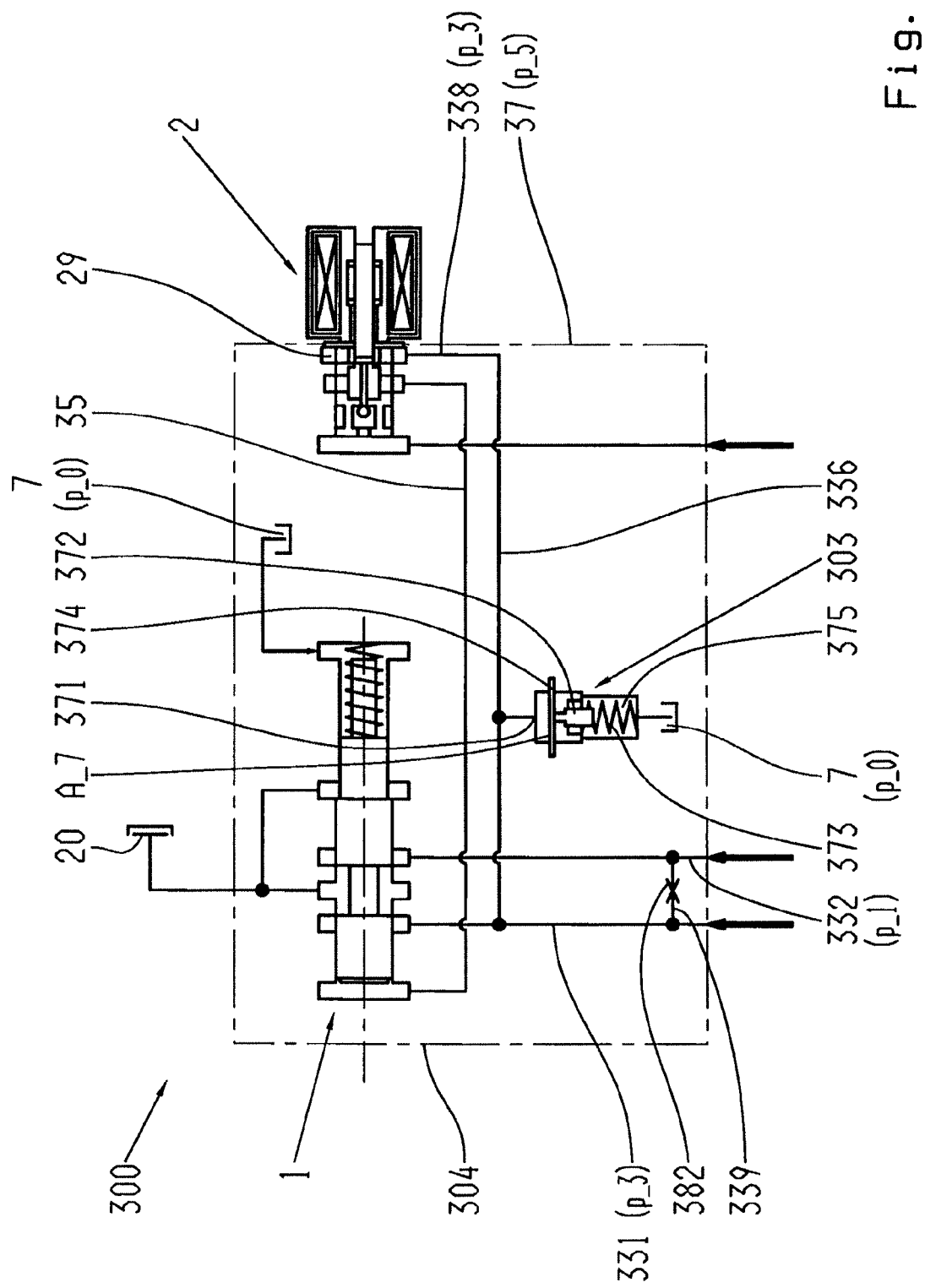
FIG. 3: A hydraulic transmission control system with a common pilot control valve for the pressure regulation valve and the pilot control valve.

FIG. 3 shows a further design of a hydraulic transmission control system 300. In this case a line 331 is connected by a line 336 to the pressure space 29. In contrast to the line 236 in FIG. 2, in the line 336 there is no constriction so the pre-filling pressure p_3 in the line 331 is equal to the pre-filling pressure p_3 in the line 338 and the pressure space 29. A pre-filling valve 303 that acts as a pressure-limiting valve is arranged in a control unit housing 304 and is connected via a connection 371 to the line 336, which is pressurized with the pre-filling pressure p_3=p_3. It is designed as a seat valve and acts as a pressure-limiting valve. Analogously to the pre-filling valves 3 and 205 in FIGS. 1 and 2, the pre-filling valve 303 consists of a piston 372, a spring 373, a valve seat 374 and a spring space 375. The pre-filling pressure p_3=p_3 acts upon the piston 372 via a valve seat surface A_7. A design as a slide valve would also be conceivable. Moreover, the pre-filling valve could also be made as a pressure-reducing valve. Thus, advantageously, the pre-filling pressure p_3=p_3 is limited upward for the pressure regulation valve 1 and also for the pilot control valve 2 by means of only one pre-filling valve. Analogously to FIG. 2, the line 332 pressurized with the system pressure p_1 is connected to the line 331 by a line 339 in which there is a constriction 382 in the form of a diaphragm aperture or throttle.

INDEXES

1 Pressure regulation valve
2 Pilot control valve
3 Pre-filling valve
4 Control unit housing
7 Ventilation space (p_0)
10 Valve slide
11 Longitudinal axis
12 Valve bore
14 Constriction
15 Control edge
16 Control edge
18 Spring guiding pin
19 Spring
20 Clutch
21 Pressure space
22 Pressure space
23 Pressure space
24 Pressure space
25 Pressure space
26 Pressure space
27 Pressure space
28 Pressure space
29 Pressure space
31 Line
32 Line
33 Line
34 Line
35 Pilot control line
37 Line
40 Valve housing
41 Electromagnet
42 Pilot control piston
43 Receiving bore
44 Guide bore
46 Control edge
48 Throttle gap
51 Throttle gap
55 Housing edge
61 Connection
62 Piston
63 Spring
64 Valve seat
65 Spring space
100 Hydraulic transmission control unit
200 Hydraulic transmission control unit
204 Control unit housing
205 Pre-filling valve
231 Line
232 Line
236 Line
236' Line
238 Line
239 Line
249 Line
271 Connection
272 Piston
273 Spring
274 Valve seat 275 Spring space
281 Constriction
282 Constriction
283 Constriction
300 Hydraulic transmission control unit
303 Pre-filling valve
304 Control unit housing
331 Line
332 Line
336 Line
338 Line
339 Line
371 Connection
372 Piston
373 Spring
374 Valve seat
375 Spring space
382 Constriction
A_1 End face
A_2 Reaction surface
A_3 Annular surface
A_4 Reaction surface
A_5 Valve seat surface
A_6 Valve seat surface
A_7 Valve seat surface
d_1 Outer diameter
d_2 Outer diameter
p_0 Ambient pressure
p_1 System pressure
p_2 Clutch pressure
p_3 Pre-filling pressure
p_3' Pre-filling pressure
p_4 Pilot control pressure
p_5 Reducing pressure

The invention claimed is:

1. A hydraulic transmission control unit comprising:
at least one pressure regulation valve (1) and at least one pilot control valve (2) which is connected, via a pilot control line (35), to the at least one pressure regulation valve (1);
a pre-filling valve (3, 303) for adjusting a first pre-filling pressure (p_3) to prevent draining of a clutch (20) and pressure lines (231, 331) connected to the pre-filling valve (3, 303) when the clutch (20) is not-actuated; and
the pilot control line (35) being connected to at least one other line (236', 238, 336, 338) which is under a second pre-filling pressure (p_3') such that draining of the pilot control line (35), when the clutch (20) is not actuated, is prevented.

2. The hydraulic transmission control unit according to claim 1, wherein the first pre-filling pressure (p_3) is greater than the second pre-filling pressure (p_3').

3. The hydraulic transmission control unit according to claim 1, wherein the first pre-filling pressure (p_3) and the second pre-filling pressure (p_3') are substantially equal to one another.

4. The hydraulic transmission control unit according to claim 1, wherein a second pre-filling valve (205) sets the second pre-filling pressure (p_3').

5. The hydraulic transmission control unit according to claim 3, wherein a common pre-filling valve (303) sets the first pre-filling pressure (p_3) and the second pre-filling pressure (p_3').

6. The hydraulic transmission control unit according to claim 1, wherein the first pre-filling pressure (p_3) and the second pre-filling pressure (p_3) are less than a clutch pressure (p_2) for actuating the clutch (20) and greater than an ambient pressure (p_0).

7. The hydraulic transmission control unit according to claim 1, wherein the pre-filling valve (3, 205, 303) is a pressure-limiting valve and is designed as a seat valve.

8. The hydraulic transmission control unit according to claim 7, wherein the pre-filling valve, designed as the seat valve, is a plate valve.

9. The hydraulic transmission control unit according to claim 1, wherein the pre-filling valve (3, 205, 303) is a pressure-reducing valve and is designed as a slide valve.

10. The hydraulic transmission control unit according to claim 2, wherein a hydraulic supply system supplies a first pressure line (231) and a second pressure line (236) with an operating medium, the first pressure line (231) and the second pressure line (236) are pressurized with the first pre-filling pressure (p_3) and are connected, via a constriction (281), to a third pressure line (238) and a fourth pressure line (236') which are pressurized with the second pre-filling pressure (p_3'), and the constriction (281) is a hydraulic resistance.

11. The hydraulic transmission control unit according to claim 4, wherein a first pressure line (231, 331), which pre-fills the pressure regulation valve (1) and the clutch (20), and a third pressure line (238, 338), which pre-fills the pilot control valve (2) and the pilot control line (35), are connected to a hydraulic supply system independently of one another.

12. The hydraulic transmission control unit according to claim 1, wherein a plurality of pilot control valves (2) are arranged in the hydraulic transmission control unit, the plurality of pilot control valves (2) are connected to a common pre-filling line such that the second pre-filling pressure (p_3') in the common pre-filling line is adjustable by a common pre-filling valve (205, 303) for all the plurality of pilot control valves (2).

13. The hydraulic transmission control unit according to claim 1, wherein a plurality of pilot control valves (2) are arranged in the hydraulic transmission control unit, and one pre-filling valve (205, 303) is associated with each of the plurality of pilot control valves (2).

14. A hydraulic transmission control unit in combination with a transmission for a motor vehicle, the transmission control unit comprising:
at least one pressure regulation valve (1) and at least one pilot control valve (2) which is connected, via a pilot control line (35), to the at least one pressure regulation valve (1);
a pre-filling valve (3, 303) for adjusting a first pre-filling pressure (p_3) to prevent draining of a clutch (20) and pressure lines (231, 331) connected to the pre-filling valve (3, 303) when the clutch (20) is not-actuated; and
the pilot control line (35) being connected to at least one other line (236', 238, 336, 338) which is under a second pre-filling pressure (p_3') such that draining of the pilot control line (35) when the clutch (20) is not actuated is prevented.

* * * * *